United States Patent [19]

Geke et al.

[11] Patent Number: 5,324,437

[45] Date of Patent: Jun. 28, 1994

[54] USE OF MOLYBDENUM COMPOUNDS FOR PAINT COAGULATION

[75] Inventors: Juergen Geke, Duesseldorf; Ragnar Margeit, Duisburg; Hans-Joerg Rehm, Hilden, all of Fed. Rep. of Germany

[73] Assignee: Henkel Kommanditgesellschaft auf Aktien, Fed. Rep. of Germany

[21] Appl. No.: 969,291

[22] PCT Filed: Aug. 2, 1991

[86] PCT No.: PCT/EP91/01464

§ 371 Date: Feb. 12, 1993

§ 102(e) Date: Feb. 12, 1993

[87] PCT Pub. No.: WO92/03511

PCT Pub. Date: Mar. 5, 1992

[30] Foreign Application Priority Data

Aug. 14, 1990 [DE] Fed. Rep. of Germany ....... 4025729

[51] Int. Cl.$^5$ ............................. B03D 3/02; C02F 1/54
[52] U.S. Cl. ..................................... 210/724; 210/728; 210/729; 210/730; 210/734; 210/725; 210/735; 55/DIG. 46
[58] Field of Search .............. 210/705, 725, 728, 729, 210/724, 735, 730, 734, 930; 55/85, DIG. 46; 252/180

[56] References Cited

U.S. PATENT DOCUMENTS

| | | | |
|---|---|---|---|
| 4,220,456 | 9/1980 | Block | 55/85 |
| 4,380,495 | 4/1983 | Maher | 210/728 |
| 4,496,374 | 1/1985 | Murphy | 55/84 |
| 4,541,931 | 9/1985 | Geke et al. | 210/728 |
| 4,629,477 | 12/1986 | Geke | 55/85 |
| 4,629,572 | 12/1986 | Leitz et al. | 210/714 |
| 4,701,220 | 10/1987 | Seng | 106/203 |
| 4,853,132 | 8/1989 | Merrell et al. | 210/712 |
| 4,933,091 | 6/1990 | Geke et al. | 210/712 |

FOREIGN PATENT DOCUMENTS

| | | |
|---|---|---|
| 0117586 | 9/1984 | European Pat. Off. . |
| 0158896 | 10/1985 | European Pat. Off. . |
| 0168625 | 1/1986 | European Pat. Off. . |
| 0193668 | 9/1986 | European Pat. Off. . |
| 0335210 | 10/1989 | European Pat. Off. . |
| 0342339 | 11/1989 | European Pat. Off. . |
| 2758873 | 3/1982 | Fed. Rep. of Germany . |
| 3405451 | 8/1984 | Fed. Rep. of Germany . |
| 3316878 | 11/1984 | Fed. Rep. of Germany . |
| 3421289 | 9/1985 | Fed. Rep. of Germany . |
| 3412763 | 10/1985 | Fed. Rep. of Germany . |
| 3810166 | 10/1989 | Fed. Rep. of Germany . |
| 3817251 | 4/1990 | Fed. Rep. of Germany . |
| 1512022 | 5/1978 | United Kingdom . |

Primary Examiner—Anthony Green
Attorney, Agent, or Firm—Ernest G. Szoke; Wayne C. Jaeschke; Norvell E. Wisdom, Jr.

[57] ABSTRACT

The invention describes the use of molybdenum compounds in circulating waters of wet precipitators of spray coating units for detackifying and coagulating paints and/ or varnishes, waxes and other organic coating compositions, and a process for detackifying and coagulating paints and/ or varnishes, waxes and other organic coating compositions by means of molybdenum-containing coagulants.

20 Claims, No Drawings

USE OF MOLYBDENUM COMPOUNDS FOR PAINT COAGULATION

FIELD OF THE INVENTION

The present invention relates to the use of molybdenum compounds in circulating waters of wet precipitators of spray coating units and to a process for detackifying and coagulating paints, waxes and other organic coating compositions by means of molybdenum-containing coagulants.

STATEMENT OF RELATED ART

If paints, waxes or similar coating materials containing water-insoluble organic substances are applied, e.g. in the automotive industry, it is not practicable to apply the materials completely onto the parts to be coated without leaving behind any residual portions thereof. More specifically, if automobiles are being painted, as is conventionally carried out in closed compartments (paint spray booths) allowing an automatic application of the paints or coating compositions, there is formed the so-called "overspray" which is trapped by a water curtain drizzling down the walls of the paint spray booths and flushed into a so-called "stabilization basin". Chemicals for detackifying and coagulating said materials will have to be added to said water so that, on the one hand, malfunctions caused by sticking paint particles on the water-conducting conduits, nozzles and sprinkler systems will be avoided and, on the other hand, the ingredients entrained in the circulating water will be removed for the disposal thereof. It is desirable that detackifying of the paint particles spattered and present in the water and the agglomeration thereof such as to form a coagulum capable of being discharged will be effected in one operation.

For coagulating conventional paints used above all in the automotive industry, there is available a series of neutral and alkaline products. To accomplish a coagulation, i.e., detackifying of the paint particles and agglomeration thereof to form a coagulum capable of being discharged, powdery alkaline or liquid alkaline as well as powdery neutral products have been added to the water circulated in the paint spray booths and in the connected conduits and aggregates. Thus, in GB-A-1,512,022 there have been described flocculating agents, i.e. agents causing the particles to amalgamate under the action of intermolecular bridge-forming macromolecules. These are composed of inorganic metal salts acting as a clarifying agent {iron(II)chloride or aluminum sulfate} and organic cationic polymers such as polyvinylpyridine or polyamines in an aqueous solution.

From the teaching of DE-A-33 16 878 there have been known liquid one-component coagulants which contain calcium and/or magnesium nitrates, chlorides and/or sulfates as well as polyethyleneimines cationically modified by protonation or alkylation.

Particularly the disposal of two-component polyurethane varnishes in the past again and again gave rise to trouble. For disposing of the mist of such varnishes and coating compositions, in DE-A-34 12 763 there have been described agents which contain cyanamide and/or dicyanamide and/or cyanamide salts in combination with materials as conventionally contained in such coagulants.

Furthermore, layer silicates of various kinds have been more recently used to an increasing extent as paint coagulating and detackifying agents; these include, for example, bentonites (U.S. Pat. No. 4,220,456), hectorites (EP-B-193 668), montmorillonites (U.S. Pat. No. 4,629,572), kaolins (U.S. Pat. No. 4,380,495) or smectite (U.S. Pat. No. 4,701,220). According to the teaching of DE-C-38 17 251, also clay, especially boehmite or pseudo-boehmite, can be employed as a paint-detackifying and -sedimenting agent.

Furthermore, it has been known from the teachings of U.S. Pat. No. 4,496,374 and of EP-A-117 586 that talc may be employed in combination with calcium oxide, hydroxide, carbonate and/or zinc stearate for coagulating and depositing high-solid varnishes. Furthermore it has been known from the teachings of DE-C-34 21 289 and of DE-C-27 58 873 that wax, especially montan wax or carnauba wax, in combination with paraffin derivatives can be employed for coagulating and detackifying portions of synthetic resin varnishes in wet depositors of spray-painting units.

From the teaching of Applicant's DE-A-38 10 166 there have further been known aqueous concentrates containing an ethylene-acrylic acid copolymer for the coagulation of paints and other organic coating compositions.

However, in spite of the multitude of formulations proposed in the prior art it has been shown that significant drawbacks had to be accepted upon the use thereof in coagulations of varnishes and other coating agents. Thus, in the case of a number of formulations, individual components will be hydrolyzed under the conditions customary in practical application. Thereby, products formed by hydrolysis, which give rise to considerable foaming, will be released. This formation of foam will require that the installations for water-sprinkling will have to be turned off for some time. However, such failures cannot be tolerated.

In addition thereto, with a number of other formulations, it was found that they are incapable of sufficiently detackifying and coagulating the oversprays of certain paints/varnishes and, thus, of preventing a failure of the sprinkling systems caused by sticking or clogging of the units or unit parts. Troubles have been caused again and again by one-component or two-component polyurethane varnishes and so-called high-solid varnishes, i.e. varnishes comprising markedly high solids proportion. In the course of the disposal of such varnishes, an undesirable stoppage of the plant due to insufficient detackifying or formation of undischargeable hard-agglomerated coagulum is observed.

DESCRIPTION OF THE INVENTION

It was the object of the present invention to ensure complete detackifying and coagulation also of such problematic varnishes. Moreover, the new coagulants were intended to be applicable also in the disposal of conventional paint and varnish systems formulated on a water-base or on an oil-base. It was further desired to develop coagulants that are usable in modern disposal plants automatically operated on an adsorptive principle (for example the so-called "ESKA" units), wherein the detackified paint particles are neither floated nor sedimented, but must be maintained in the dispersed state. Hence, dispersing the detackified paint particles to a sufficient degree was another object of the present invention.

SUMMARY OF THE INVENTION

Surprisingly, it has now been found that an excellent detackifying of the paint particles of conventional paints, and even of the problematic paints, and the formation of paint residues capable of being dispersed, and therefore of being disposed of by an adsorptive route, is feasible, if molybdenum compounds are added to the coagulating agents known from the state of the art.

Accordingly, the present invention relates to the use of molybdenum compounds in circulating waters of wet precipitators of spray coating units for detackifying and coagulating paints, waxes and other organic coating compositions

DESCRIPTION OF PREFERRED EMBODIMENTS

In the use according to the invention of molybdenum compounds in coagulants, one or even more of the agents described in the art will synergistically cooperate with molybdates. Molybdates as components of said coagulants within the scope of the invention may be molybdenum(VI)oxide which may optionally be present in the form of its hydrate as well. It may be added, for example, as a powder to other powdery coagulants. However, molybdates within the scope of the present invention also may be water-soluble molybdate salts, i.e. monomolybdates and polymolybdates, which individually or in combination with each other or also in combination with molybdenum trioxide may constitute the synergistically active component in the molybdenum-containing coagulants. In preferred embodiments of the invention, suitable as the water-soluble molybdate salts are alkali metal and/or ammonium salts of molybdic acid and/or isopolymolybdic acids. Among these, the sodium or ammonium molybdates, especially $Na_2MoO_4$, are particularly preferred. Coagulants containing sodium molybdates, in addition to other materials conventional in such agents, are capable of completely detackifying, and disposing of, mists of even those paint or varnish types, the treatment of which with prior art coagulants had been considered as problematic if not indeed impossible.

Under the aspect of a continuous addition of molybdenum compounds to the circulating water of paint spray booths, amounts of from 0.02 to 5 ppm per hour, and preferably from 0.5 to 2.5 ppm per hour, have proven to be particularly effective.

The invention in the first place resides in the recognition that the molybdenum compounds dissolved in the circulating water of the paint spray booths act together in a synergistic manner with other components of coagulants and cause an improvement to be achieved in detackifying and coagulating the paint particles, which improvement clearly exceeds the sum of the detackifying and coagulating effects provided by the individual components. Moreover, surprisingly, it was found that such a synergistic effect does occur with a multiplicity of quite different coagulating agents which, in addition to said molybdenum components, contain individual components or a plurality of components which are conventional for such coagulants and have been known from prior art.

Thus, in the molybdenum-containing coagulants there may be contained one or more layer silicate(s), for example those compounds known from the teachings of U.S. Pat. Nos. 4,220,456, 4,629,572, 4,380,495 and U.S. Pat. No. 4,701,220 as well as European Patent Specification EP-B-193 668, which in preferred embodiments are derived from the group of bentonites, hectorites, montmorillonites and/or kaolins.

It has further been shown that combinations of bentonite and kaolin or of bentonite and hectorite in coagulants comprise a very advantageous coagulation potential. By use of coagulants which contain, in addition to molybdates, a combination of such layer silicates, even one-component varnishes, polyester varnishes, or one-component polyurethane varnishes having a high solids content, even in the "high-solid grade", which otherwise could be only insufficiently detackified and coagulated, could be disposed of without residues from the circulating water of spray booths.

In the use according to the invention of molybdenum compounds in conventional coagulants, in the place of or in addition to the above-mentioned components there may be contained the materials known from the teaching of GB-A-1,512,022, such as one or more water-soluble aluminum salts and/or calcium salts and/or magnesium salts, with the nitrates, chlorides and/or sulfates being especially preferred from the group of the salts mentioned. Such salts —if completely water-soluble—can contribute to detackifying and dispersing well even particles of those varnishes which in the prior art could not be, or could only insufficiently be, disposed of.

Within the scope of the present invention, the molybdenum compounds may be employed also in and/or in combination with the following varnish-coagulating agents known from the literature:

Aqueous wax dispersions, which according to the teachings of DE-C-27 58 873 and DE-C-34 21 289, respectively, substantially consist of montan wax, carnauba wax and/or paraffin derivatives;

aqueous concentrates of ethylene-acrylic acid copolymers consisting, according to the teaching of Applicant's DE-A-38 10 166, of from 8 to 25% by weight of acrylic acid moieties and from 92 to 75% by weight of ethylene moieties, relative to the acid form of the copolymer, and are present as a salt of an inorganic or organic base, preferably in the form of alkali metal, ammonium, amine or alkanolamine salts;

an aqueous talc dispersion which, according to the teachings of EP-B-117 586, DE-A-34 05 451 and U.S. Pat. No. 4,496,374 substantially consist of talc, water-soluble polyhydroxy compounds, calcium salts and zinc stearate;

aqueous clay dispersions which, according to teaching of DE-C-38 17 251, contain pseudo-boehmite or boehmite clay ($Al_2O_3$) besides conventional foam suppressors.

In combination with, or in the place of, one or more components mentioned above as usually present in such coagulants, in the molybdenum-containing coagulants there may be contained polyethyleneimines which have been cationice ally modified by protonation or alkylation. Such polyethyleneimines which have been known, for example, from the teaching of DE-A-33 16 878, may be advantageously employed together with the above-mentioned calcium salts and/or magnesium salts and preferably are present in an amount corresponding to a molar ratio of salt:polyethyleneimine of from 50:1 to 1:1. The polyethyleneimines have been cationically modified by either protonation or alkylation, methylation, of the nitrogen, i.e., they have converted into the corresponding ammonium salts. The degree of modification thereof varies and depends on the neutral starting polymer, of the acid used for protonation or on the alkylating agent used for the alkylation, respectively. Tertiary nitrogen atoms of such polymers will not be completely protonated or alkylated, respectively. Usable are protonated and/or alkylated, and preferably methylated polyethyleneimines which have molecular weights within the range of from $5 \times 10^4$ to $5 \times 10^7$, and preferably within the range of from $7.5 \times 10^4$ to $5 \times 10^6$.

Even though excellent synergistic results can be obtained with coagulating agents conforming to the above description, it is basically possible in addition thereto to comply with particular requirements set for such coagulants by adding further conventional active ingredients and/or auxiliary materials thereto. The coagulants may contain, for example, the materials known from DE-A-34 12 763, such as cyanamide and/or dicyanamide and/or cyanamide salts in or together with the molybdates contained according to the invention. Surprisingly, an extremely efficient coagulation of paints and other organic coating compositions, and more specifically of two-component polyurethane varnishes, is successfully accomplished by the use of a combination which contains, besides the molybdates contained according to the invention, cyanamide or dicyandiamide (1-cyanoguanidine) or calcium cyanamide, and these components are particularly well active if contained in the circulating water of paint spray booths, i.e. in an aqueous solution at pH values between 3 and 12, and preferably between 6.5 and 8.5. Besides surprisingly well detackifying the varnish particles and agglomerating same to form a well dispersed, and in this form dischargeable, coagulum, said cyanamide derivatives have the advantage of that remainders thereof, which do not participate in detackifying and agglomerating, will be slowly and continuously dissolved in water to form $NH_3$ and $CO_2$ while leaving no residue and, thus, will not in any way pollute the circulating water. The ammonia formed is effective as a corrosion inhibitor in solution as well as in the vapor space for equipment parts made of iron and steel.

As additional active materials there may also be successfully employed the alkali metal or alkaline earth metal salts such as the hydroxides, carbonates and/or hydrogen carbonates known from the teaching of the DE-A-15 17 409 in and/or together with the molybdenum compounds in the coagulants. Further specific requirements set for the paint coagulants may be, for example, adjusting to a definite pH value, which preferably is within the range from 1 to 14, or more preferably within one of the ranges from 2.5 to 5 or from 7.5 to 9.5, or rendering the coagulants antimicrobial. An additive suitable for this purpose is, for example, boric acid, which has antimicrobial activity and if required may also contribute to adjusting the pH value. The pH adjustment may also be effected by adding phosphoric acid, organic acids such as citric acid and other non-corrosive acids or the acidic salts thereof. For adjusting the pH value of acidic solutions there are preferably used basic compounds such as alkali metal hydroxides, amines or alkanolamines. Additionally or in the place thereof there may also be used biocides. Examples thereof are formaldehyde, isothiazoline and the derivatives of both as well as pyridine-N-oxide and its derivatives.

As the further possible components of the molybdenum-containing coagulants there may also be considered corrosion inhibitors and additional anti-foam agents. As the corrosion inhibitors there are used water-soluble salts of phosphonic acids and zinc salts, preferably the sodium salt of the 2-phosphonobutane-1,2,4-tricarboxylic acid or the zinc salt of the 2-pyridinethiol-1-oxide. As an anti-foam agent, the product Dehydran ™ F (from the company Henkel KGaA) has proven to be valuable, in addition to the agents known for this purpose from prior art.

According to a particularly preferred embodiment of the present invention, the molybdenum-containing paint coagulants contain at least one of the following components a) through g) as active ingredients:
a) from 0.5 to 99% by weight of at least one inorganic layer silicate, preferably one from the group of montmorillonites, bentonites, hectorites or kaolins,
b) from 0.5 to 99% by weight of at least one salt of calcium, magnesium, aluminum or iron, preferably in the form of the nitrate, chloride or sulfate,
c) from 5 to 20% by weight of at least one wax, preferably in the form of an aqueous dispersion,
d) from 2 to 25% by weight of at least one ethylene-acrylic acid copolymer which comprises from 8 to 25% by weight of acrylic acid moieties and from 92 to 75% by weight of ethylene units, relative to the acid form of the copolymerisate and is present as a salt of an inorganic or organic base, preferably in the form of an aqueous concentrate,
e) from 0.5 to 99% by weight of talc,
f) from 0.5 to 99% by weight of clays, and
g) from 0.5 to 5% by weight of at least one polymer ethyleneimine and/or of protonated or alkylated derivatives of polyethyleneimine.

In a further preferred embodiment of the present invention, the molybdenum-containing paint coagulants additionally contain at least one of the following components h) through j):
h) at least one compound from the group of cyanamide, dicyandiamide or the cyanamide salts, and preferably dicyandiamide or calcium cyanamide,
i) at least one hydroxide, carbonate or hydrogencarbonate of the alkali metals or alkaline earth metals,
j) active ingredients and/or auxiliary materials as conventional in paint coagulants, and preferably biocides, pH-regulating materials, corrosion inhibitors, anti-foam agents or solubilizers.

The preparation of the paint coagulant is effected by mixing the above-mentioned individual components in the ratios of amounts as indicated. To this end, the substantially solid individual components in the form of powders are mixed to thereby compound powdery coagulants. Compounding in powder form is particularly preferred according to the invention, since it facilitates the storage and transportation of the coagulants and any problem caused by the sedimentation of solids in larger containers cannot occur at all. Moreover, the larger or lesser amounts of water that must be added to such powders to form slurries or solutions as a further marketed product class will not have to be transported from e the site of preparation to the site of use. Nevertheless it is even possible already at the production site to mix the appropriately prepared powdery coagulants into stirred water such as to meet any specific demands of the user. The preparation of such slurries or solution may be carried out not only by directly mixing the appropriately prepared powdery coagulants into stirred water, but also by combining the aqueous slurries or solutions of the individual components. Such slurries contain all of the active ingredients in combination amounting to a total content of from 5 to 12% by weight, and preferably of from 8 to 10% by weight. Then the mixtures in the form of powders, aqueous solutions or aqueous slurries, when the occasion arises and/or at the site of use, may be introduced into the application cycle, i.e., for example, into the circulating water of paint spray booths. The addition to the circulating water is appropriately done at a location of vigorous turbulence of the circulating water with the pump being in operation to ensure a rapid distribution.

The metered addition of the coagulants according to the invention is effected either continuously by means of suitable, optionally automated, devices for a metered addition or discontinuously, e.g. once a day. The coagulants according to the invention are added to the circulating waters in amounts such that the weight amounts comprise from 20 to 100% of the calculated amount of paint overspray. This means that, for a calculated amount of paint overspray, from 20 to 100%, relative to said amount, of the aqueous slurry, which slurry contains from 5 to 12 by weight, and preferably from 8 to 10% by weight, of the powdery active ingredients and from 88 to 95% by weight, and preferably from 90 to 92% by weight, of water, will have to be added. In the case of a direct addition of the powdery products, the amount added thereof is accordingly lower than that indicated for the slurry. With respect to the amount added it must be altogether taken care of that enough molybdate will be contained in the circulating water such as to ensure complete detackifying and coagulation of the paint particles.

A further subject matter of the present invention relates to a process for detackifying and coagulating paints and varnishes, waxes and other organic compositions, which process is characterized in that a molybdenum compound is added in combination with coagulants known from the literature to the circulating water in wet precipitators of spray coating units.

In a preferred embodiment of the process according to the invention the pH value of the circulating water is adjusted to either a weakly acidic value within the range of from 2.5 to 5 or to a weakly alkaline range of from 7.5 to 9.5.

By way of the use of the concentrations as set forth, complete detackifying and coagulation can advantageously be achieved also with those paints and varnishes which could be detackified not at all or only insufficiently by the use of coagulants, especially molybdate-free coagulants, so far known from prior art. The detackified paint or varnish particles may be excellently coagulated to form larger agglomerates which do not adhere to the walls of conduits, pumps and containers, but are uniformly distributed in the dispersion and may also be disposed of without trouble by automated units. The latter condition is particularly advantageous in the automated paint disposal lines coming into use to an increasing degree, which disposal lines employ the principle of an adsorptive disposal of the paint oversprays ("ESKA" units).

The invention is further illustrated by the subsequent examples.

EXAMPLES

EXAMPLE 1
Powdery coagulating agent
 2.0% by weight of sodium molybdate
 57.0% by weight of bentonite[1]
 20.0% by weight of aluminum sulfate
 15.0% by weight of aluminum oxide
 2.4% by weight of boric acid
 3.0% by weight of talc
 0.6% by weight of protonated polyethyleneimine[2]

EXAMPLE 2
Powdery coagulating agent
 2.0% by weight of sodium molybdate
 90.0% by weight of bentonite[1]
 8.0% by weight of dicyandiamide

EXAMPLE 3
Powdery coagulating agent
 2.0% by weight of sodium molybdate
 88.0% by weight of bentonite[1]
 10.0% by weight of dicyandiamide

EXAMPLE 4
Liquid coagulating agent
 2.0% by weight of sodium molybdate
 33.0% by weight of calcium chloride
 5.0% by weight of magnesium chloride
 4.0% by weight of protonated polyethyleneimine[2]
 56.0% by weight of water

EXAMPLE 5
Liquid coagulating agent
 2.0% by weight of sodium molybdate
 43.0% by weight of ethylene-acrylic acid copolymer[3]
 2.0% by weight of dicyandiamide
 53.0% by weight of water

COMPARATIVE EXAMPLE
Powdery coagulating agent
 90.0% by weight of bentonite[1]
 10.0% by weight of dicyandiamide Notes:
[1]"Aktiv-Bentonit B", company Erbslöh, Düsseldorf.
[1]"Super Floc ™ C 577", company American Cyanamide Co.,
[2]"U.S.A.; MW: about 2 × 10⁵; in a 50% by weight aqueous solution.
[3]"Poligen ™ WE", company BASF.

TABLE
PAINT-COAGULATING PROPERTIES OF MOLYBDENUM-CONTAINING COAGULANTS

| PAINT/ VARNISH | COAGULANT | APPEARANCE | RESULT OF COAGULATION |
|---|---|---|---|
| High Solids Primer Surfacer[1] | Comparative Example | Coarsely dispersed | Dischargeable[3] |
|  | Example 3 | Finely dispersed | Detackified |
| Black out | Comparative Example | Coarsely dispersed | Dischargeable[3] |
|  | Example 3 | Finely dispersed | Detackified |

[1]Polyester paint from BASF (63% solids content).
[2]Polyester paint from BASF (30% solids contents)
[3]Surface detackified, but still tacky inside.

The coagulating effect of Example 3 according to the invention and of the Comparative Example were tested with 2 different polyester paints. Here, all tests were carried out with each of 20% by weight and 100% by weight of the coagulating agents, relative to 100 g of paint overspray. Surprisingly, Example 3 according to the invention exhibited improved detackifying properties along with a finely dispersed appearance.

We claim:
1. A process for detackifying and coagulating paints, waxes and similar coating compositions containing water-insoluble organic substances, said process comprising adding to circulating water containing the paints, waxes, or similar coating compositions containing water-insoluble organic substances a coagulant consisting essentially of: (I) a molybdenum containing component selected from the group consisting of one or more water-soluble alkali metal and ammonium salts of molybdic acid and of isopolymolybdic acid: and
  (II) at least one of the following components a) through g):
  a) from 0.5 to 99% by weight of at least one inorganic layer silicate,
  b) from 0.5 to 99% by weight of at least one salt of calcium, magnesium, aluminum or iron,
  c) from 5 to 20% by weight of at least one wax,
  d) from 2 to 25% by weight of at least one ethylene-acrylic acid copolymer which comprises from 8 to 25% by weight of acrylic acid moieties and from 92 to 75 by weight of ethylene units in the acid form of the copolymer,
  e) from 0.5 to 99% by weight of talc,
  f) from 0.5 to 99% by weight of clays, and
  g) from 0.5 to 5% by weight of at least one polymer selected from the group consisting of polyethyleneimine and/or of protonated or alkylated derivatives of polyethyleneimine; and, optionally,
  (III) at least one of the following components h) through j);
  h) at least one compound selected from the group consisting of cyanamide, dicyandiamide and the cyanamide salts,
  i) at least one hydroxide, carbonate or hydrogencarbonate of the alkali metals or alkaline earth metals, and
  j) at least one component selected from the group consisting of biocides, pH-regulating materials, corrosion inhibitors, anti-foam agents and solubilizers,
wherein the molybdenum containing component is added to the circulating water in amounts of from 0.02 to 5 ppm per hour.

2. A process according to claim 1, wherein the molybdenum containing component is sodium molybdate, ammonium molybdate, or a mixture thereof.

3. A process according to claim 1, wherein the molybdenum containing component is added to the circulating water in amounts of from 0.5 to 2.5 ppm per hour.

4. A process according to claim 1, wherein at least one of components h) through j) is present in the coagulant.

5. A process according to claim 1, wherein the coagulant is in the form of powder, aqueous solution or aqueous dispersion.

6. The process according to claim 1, wherein the pH value of the circulating water is within the range of from 1 to 14.

7. A process according to claim 6, wherein the ph value of the circulating water is within the range of from 2.5 to 5 or within the range of from 7.5 to 9.5.

8. A process according to claim 1, wherein there is present in the coagulant at least one of the following components:
  a) from 0.5 to 99% by weight of at least one of montmorillonites, bentonites, hectorites or kaolins,
  b) from 0.5 to 99% by weight of at least one nitrate, chloride or sulfate of calcium, magnesium, aluminum or iron,
  c) from 5 to 20% by weight of at least one wax in the form of an aqueous dispersion,
  d) from 2 to 25% by weight of at least one ethylene-acrylic acid copolymer which comprises from 8 to 25% by weight of acrylic acid moieties and from 92 to 75 by weight of ethylene units in the acid form of the copolymer and is present in the form of an aqueous concentrate,
  e) from 0.5 to 99% by weight of talc,
  f) from 0.5 to 99% by weight of clays, and
  g) from 0.5 to 5% by weight of at least one polymer selected from the group consisting of polyethyleneimine and protonated and alkylated derivatives of polyethyleneimine.

9. A process according to claim 8, wherein the molybdenum containing component is sodium molybdate, ammonium molybdate, or a mixture thereof.

10. A process according to claim 9, wherein the molybdenum containing component is added to the circulating water in amounts of from 0.5 to 2.5 ppm per hour.

11. A process according to claim 10, wherein there is present in the coagulant at least one of the following components h) through j):
  h) at least one compound selected from the group of consisting of cyanamide, dicyandiamide and the cyanamide salts,
  i) at least one hydroxide, carbonate or hydrogencarbonate of the alkali metals or alkaline earth metals,
  j) at least one component selected from the group consisting of biocides, pH-regulating materials, corrosion inhibitors, anti-foam agents and solubilizers.

12. A process according to claim 11, wherein there is present in the coagulant at least one of the following components h) through j):
  h) at least one compound selected from the group of consisting of dicyandiamide and calcium cyanamide,
  i) at least one hydroxide, carbonate or hydrogencarbonate of the alkali metals or alkaline earth metals,
  j) at least one component selected from the group consisting of biocides, pH-regulating materials, corrosion inhibitors, anti-foam agents and solubilizers.

13. A process according to claim 12, wherein the coagulant is in the form of powder, aqueous solution or aqueous dispersion.

14. A process according to claim 11, wherein the coagulant is in the form of powder, aqueous solution or aqueous dispersion.

15. A process according to claim 14, wherein the pH value of the circulating water is within the range of from 1 to 14.

16. A process according to claim 15, wherein the pH value of the circulating water is within the range of from 2.5 to 5 or within the range of from 7.5 to 9.5

17. A process according to claim 13, wherein the pH value of the circulating water is within the range of from 1 to 14.

18. A process according to claim 17, wherein the pH value of the circulating water is within the range of from 2.5 to 5 or within the range of from 7.5 to 9.5.

19. A process according to claim 12, wherein the pH value of the circulating water is within the range of from 1 to 14.

20. A process according to claim 14, wherein the pH value of the circulating water is within the range of from 2.5 to 5 or within the range of from 7.5 to 9.5.

* * * * *

UNITED STATES PATENT AND TRADEMARK OFFICE
CERTIFICATE OF CORRECTION

PATENT NO. : 5,324,437
DATED : June 28, 1994
INVENTOR(S) : Geke et. al.

It is certified that error appears in the above-indentified patent and that said Letters Patent is hereby corrected as shown below:

On title page, [22] PCT filed, should read:
    -- Aug. 3, 1991 --.

In claim 1, column 9, line 13, after 75, insert:
    -- % --.

In claim 8, column 9, line 58, "or", should read:
    -- and --.

In claim 20, column 10, line 62, "claim 14", should read:
    -- claim 19 --.

Signed and Sealed this

Twenty-fifth Day of April, 1995

Attest:

BRUCE LEHMAN

*Attesting Officer*      *Commissioner of Patents and Trademarks*